Aug. 23, 1927.

W. I. MARTIN 1,639,700

MACHINE FOR ASSEMBLING PARTS OR ELEMENTS OF FABRICATED ARTICLES

Filed Aug. 29, 1924 3 Sheets-Sheet 1

Inventor
Wallace I. Martin
by
H. A. Pattison Atty.

Aug. 23, 1927.  
W. I. MARTIN  
1,639,700  
MACHINE FOR ASSEMBLING PARTS OR ELEMENTS OF FABRICATED ARTICLES  
Filed Aug. 29, 1924  3 Sheets-Sheet 2
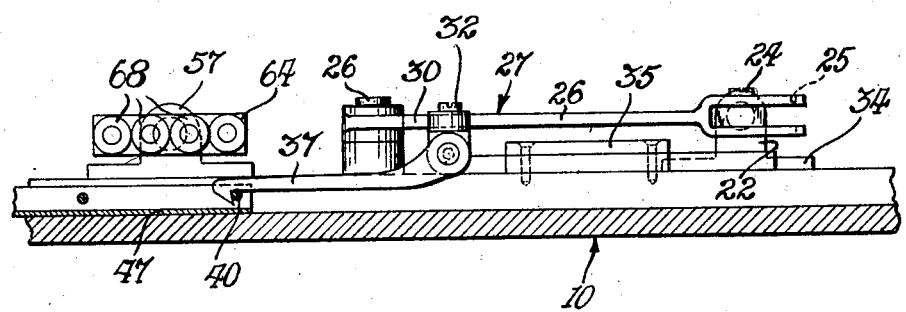

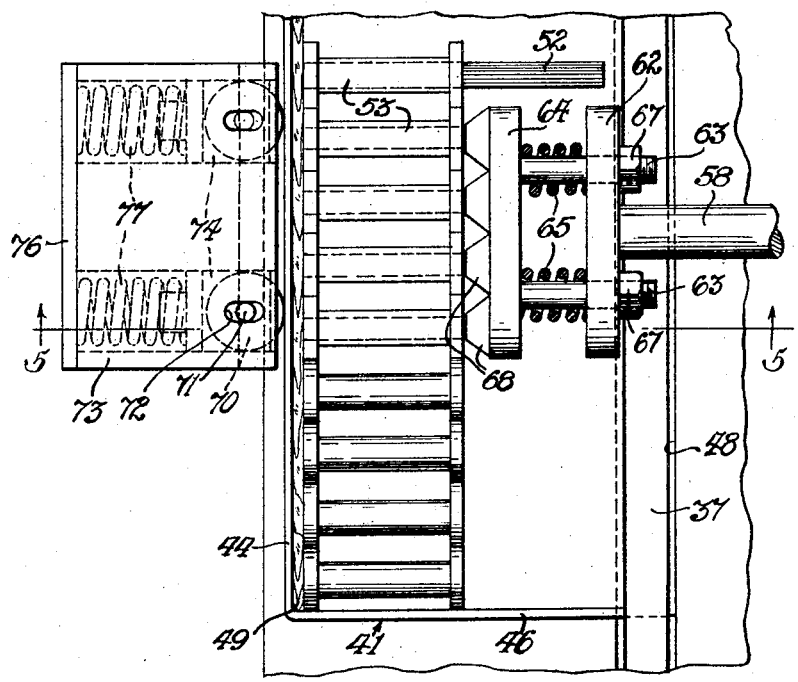
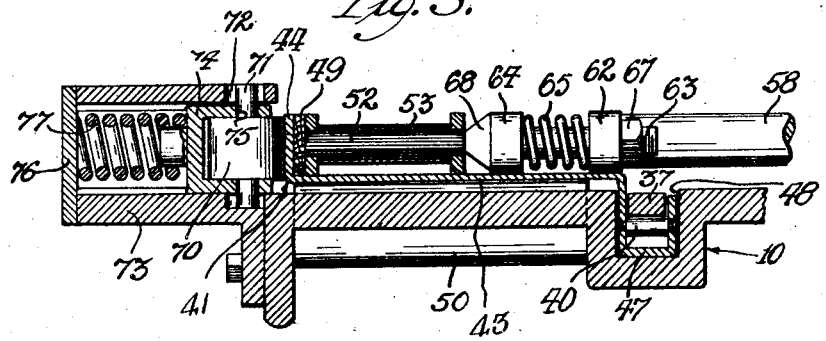

Patented Aug. 23, 1927.

1,639,700

UNITED STATES PATENT OFFICE.

WALLACE INGERSOLL MARTIN, OF CHICAGO, ILLINOIS, ASSIGNOR TO WESTERN ELECTRIC COMPANY, INCORPORATED, OF NEW YORK. N, Y., A CORPORATION OF NEW YORK.

MACHINE FOR ASSEMBLING PARTS OR ELEMENTS OF FABRICATED ARTICLES.

Application filed August 29, 1924. Serial No. 734,941.

This invention relates to machines for assembling parts or elements of fabricated articles.

The primary object of the invention is to provide a simple machine or apparatus which does not require the attention of a skilled operator and which will rapidly assemble parts or elements of a fabricated article without injury thereto.

One form of the invention is embodied in a machine adapted to assemble the laminated cores of one type of electromagnetic coils with the frames thereof, these parts being placed in a partially assembled condition upon a carrier which is intermittently advanced through an assembling position where a plurality of cores are simultaneously forced into their correct positions in the frames. Yielding means force the cores into the frames which are held against displacement during the assembling operation by other yielding means. This construction prevents injury to the cores or frames.

Other objects and features of the invention will become apparent as the detailed description progresses, reference being had to the accompanying drawings, wherein Fig. 1 is a plan elevation of a machine embodying the invention;

Fig. 2 is a section taken on line 2—2 of Fig. 1;

Fig. 3 is a section taken on line 3—3 of Fig. 1;

Fig. 4 is an enlarged plan elevation of a portion of the machine;

Fig. 5 is a section taken on line 5—5 of Fig. 4; and

Figure 1:
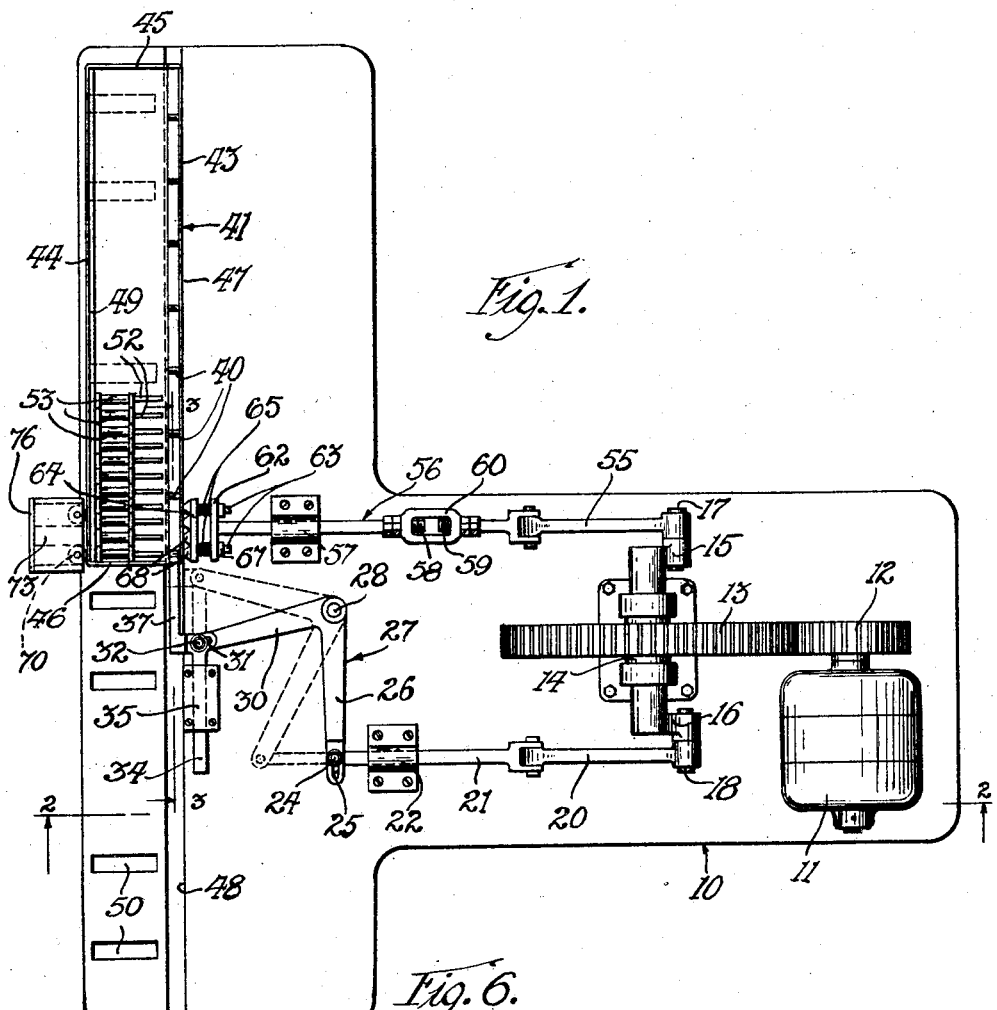

Referring to the drawings, the reference character 10 designates in general the frame of a machine embodying the invention and comprising an electric motor 11 mounted upon the frame 10, the motor 11 being provided with a pinion 12 adapted to mesh with a gear 13 which is rigidly secured to a shaft 14. The shaft 14 is provided with a plurality of crank arms 15 and 16 which carry crank pins 17 and 18 respectively.

A pitman 20 operatively connects the crank pin 18 with a push rod 21 slidably journaled in a bearing 22 secured to the frame 10. Projecting from one end of the rod 21 is a pin 24 adapted to ride in a slot 25 formed in the arm 26 of a bell crank lever 27 which is pivotally mounted on the frame 10 by a pin 28. The other arm of the bell crank lever 27 is designated by the reference character 30 and is provided with a slot 31 in which rides a pin 32 projecting from a slide 34 which is journaled in a bearing 35 secured to the frame 10. A pawl 37 pivotally secured to the slide 34 by means of a pin 38 is adapted to engage a plurality of pins 40 arranged in spaced relation in a carrier 41. As best shown in Figs. 1 and 5, the carrier 41 comprises a bent plate 43 adapted to support the elements or parts which are to be assembled, the bent plate being shaped to provide the carrier 41 with a back wall 44, a plurality of end walls 45 and 46, and a downwardly extending U-shaped member 47 which is adapted to ride in a groove 48 formed in the frame 10. The back wall 44 is provided with a lining 49 of wood, which tends to prevent injury to the parts assembled in the machine. It will be noted that the pins 40 are disposed in the U-shaped member 48 and that the pawl 37 is adapted to enter the U-shaped member to engage the pins. A plurality of rollers 50 rotatably journaled in the frame 10 support the carrier 41 and permit it to be advanced in a path substantially parallel to the groove 48.

Figure 6:
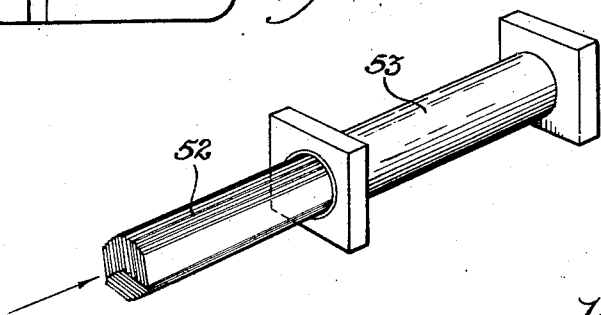
Fig. 6 is a perspective view showing the several parts or elements of a coil which the improved machine is adapted to assemble.

Referring for the present to Fig. 6, the reference characters 52 and 53 designate a laminated core and a frame, respectively, which the improved machine is particularly adapted to assemble, the core and frame being parts of a well known type of coil. As shown in Fig. 1, the carrier 41 is adapted to hold a plurality of frames 53, each of the frames having associated therewith a core 52 which has previously been inserted a short distance into the frame by the operator, or by any suitable means (not shown).

A pitman 55 operatively connects the aforementioned crank pin 17 with a plunger 56 slidably journaled in a bearing 57 mounted upon the frame 10. The plunger 56 comprises a plurality of rod sections 58 and 59 joined by a turnbuckle 60 which may be employed to lengthen or shorten the plunger. Fastened to one end of the plunger 56 is a plate 62 which slidably journals a plurality of threaded pins 63 projecting from a plate 64. A plurality of helical compression springs 65 disposed around the threaded pins 63 urge the plate 64 in a direction away from the plate 62, a plurality of nuts 67 upon the threaded pins 63 being adapted to limit the displacement of the plate 64 relative to the plate 62. The plate 64 carries a plurality of cushions 68 of rubber or any other suitable material, which cushions are so spaced that they may engage a corresponding number of cores 52 held by a plurality of frames 53 disposed in close proximity to each other.

Aligned with the plunger 56 are a plurality of rollers 70 adapted to contact the back wall 44 of the carrier 41. Each of the rollers 70 is rotatably journaled upon a pin 71 which has each of its ends disposed in one of a plurality of slots 72 formed in a bracket 73 which is rigidly secured to the frame 10. Associated with each pin 72 is a bifurcated member 74 slidably journaled in the bracket 73, the pin 72 being arranged in apertures 75 formed in the bifurcated member. Interposed between each bifurcated member 74 and a plate 76 secured to the bracket 73 is a helical compression spring 77 which yieldingly holds its associated roller 70 in contact with the back wall 44 of the carrier 41.

In the operation of the machine, the operator first loads the carrier 41 with a plurality of frames 53 arranged as illustrated in Fig. 1, each frame being provided with a laminated core 52. The carrier is then positioned as shown in Fig. 1 and the motor 11 is connected to a suitable source (not shown) of electrical current to set the machine in operation. The motor 11 will drive the crank shaft 15, which will in turn reciprocate the push rod 21 and the plunger 57 through the medium of the pitmen 20 and 55 respectively. The plunger 56 will bring the cushions 68 into engagement with a like number of cores 52 and force the cores 52 into their respective frames 53. During this assembling operation, the springs 77 urge the rollers 70 against the back wall 44 of the carrier 41 and thereby prevent displacement of the frames. The push rod 21 is advanced in unison with the plunger 56 to bring the bell crank lever 27 and the slide 34 into the positions wherein they are shown in dotted lines in Fig. 1. This movement of the slide 34 brings the pawl 37 into a position wherein it engages a pin 40, the pins 40 being spaced apart by distances which equal the stroke of the slide. As the plunger 56 and the push rod 21 are retracted, the pawl 37 will draw the carrier 41 into a position which will align the next several unassembled frames and cores with the cushions 68. The cycle of operations will then be repeated until all of the parts carried by the carrier 41 have been assembled. As the carrier 41 may be readily removed from the machine, it is obvious that a plurality of carriers may be provided so that the operator may place a loaded carrier in the machine before a carrier of completed assemblies is removed and thus, the machine may be kept in substantially continuous operation.

It will be readily understood that the cushions 68, the springs 65 and the springs 77 cooperate to prevent injury to the cores 52 or to the frames 53. The frames 53 generally comprise tubular portions of paper which are easily injured. They also comprise a plurality of wooden blocks which may be stripped from the tubular portions if undue pressure is placed upon them. The cushions and the springs are so designed that they will permit the mechanism to force the cores into the frames but will yield if pressure is applied to the frames after the cores have been correctly positioned therein.

What is claimed is:

1. In an assembling machine for assembling core and tubular members, a carrier for a plurality of members to be assembled, means for bringing the carrier into an assembling position, yielding means for forcing a core member into a tubular member when the carrier is in the assembling position, and yielding means for holding tubular members in position during the forcing operation.

2. In an assembling machine for assembling laminations within tubes, a carrier for a plurality of laminations and tubes to be assembled, means for bringing the carrier into an assembling position, yielding means for forcing a plurality of laminations into a tube when the carrier is in the assembling position, and yielding means for holding the tube in position during the forcing operation.

3. In an assembling machine for assembling core laminations and companion tubes, a carrier for a plurality of core laminations partially inserted within the companion tubes, yielding means for completing the assembly of the laminations and tubes, means for causing a relative movement between the carrier and the assembling means to operatively associate the laminations and tubes with the assembling means, and yielding means for holding the tubes during the assembling operation.

In witness whereof, I hereunto subscribe my name this 20 day of August A. D., 1924.

WALLACE INGERSOLL MARTIN.